(12) United States Patent
Kuo

(10) Patent No.: US 7,583,544 B2
(45) Date of Patent: Sep. 1, 2009

(54) DATA READING CIRCUIT

(75) Inventor: Tung-Chen Kuo, Hsin-Chu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 11/942,698

(22) Filed: Nov. 19, 2007

(65) Prior Publication Data
US 2008/0117693 A1 May 22, 2008

(30) Foreign Application Priority Data
Nov. 21, 2006 (TW) .............................. 95143072 A

(51) Int. Cl.
*G11C 7/00* (2006.01)
(52) U.S. Cl. ............. 365/189.15; 365/194; 365/233.11; 365/191
(58) Field of Classification Search ............ 365/189.15, 365/194, 233.11, 191
See application file for complete search history.

(56) References Cited

U.S. PATENT DOCUMENTS

| 5,467,464 | A | * | 11/1995 | Oprescu et al. ............. 713/400 |
| 5,864,706 | A | * | 1/1999 | Kurokawa et al. ............ 712/35 |
| 6,052,329 | A | | 4/2000 | Nishino |
| 6,316,980 | B1 | | 11/2001 | Vogt et al. |
| 6,401,213 | B1 | | 6/2002 | Jeddeloh |
| 6,529,424 | B2 | | 3/2003 | Koutsoures |
| 6,847,558 | B1 | | 1/2005 | Fischaber |
| 6,925,014 | B1 | | 8/2005 | Fischaber |
| 6,940,768 | B2 | | 9/2005 | Dahlberg et al. |
| 2007/0064850 | A1 | * | 3/2007 | Tamura ..................... 375/355 |

\* cited by examiner

*Primary Examiner*—Thong Q Le
(74) *Attorney, Agent, or Firm*—Winston Hsu

(57) ABSTRACT

Disclosed is a data reading circuit, including: a first register, for receiving a first data signal and generating a second data signal by sampling the first data signal via the first edge of a first predetermined signal; a second register, for sampling a second data signal by the second edge of a second predetermined signal to generate a third data signal; a first selector, for selecting one of the second and third data signals as a fourth data signal according to the phase difference between the first and second predetermined signals; a second selector, for selecting one of the fourth and a fifth data signals as a sixth data signal according to a selecting signal; and a third register, for sampling the sixth data signal to form the fifth data signal according to the first edge of the second predetermined signal.

18 Claims, 8 Drawing Sheets

US 7,583,544 B2

DATA READING CIRCUIT

BACKGROUND OF THE INVENTION

1. Field of the Invention

The present invention relates to a data reading circuit, and particularly relates to a data reading circuit which adjusts according to a delay state of the data reading clock signal of the memory.

2. Description of the Prior Art

In modern electronics, a memory is used for storing various kinds of data, where a data reading clock signal is used for reading the data in the memory. The elements and connection lines of an electronic apparatus become complicated as related techniques improve, however, potentially resulting in delay of the data reading clock signal. Such an error may be caused by the delay when reading data through a pad. If the memory is used for ASICs (Application Specific Integrated Circuit), such a problem becomes even more serious. Because each ASIC has its different characteristics, the system may be unstable and a design error will occur if the problem of a delayed data read clock signal is not solved.

Many inventions and related techniques are developed for solving this problem. FIG. 1 discloses a prior art data reading circuit, which is disclosed in U.S. Pat. No. 6,529,424. As shown in FIG. 1, a memory 101 is used for storing data, and an ASIC 103 provides a data reading clock signal to the memory 101 for data reading. The ASIC 103 further includes a test port 105 to send the test signal TS to the memory 101, and a feedback port 107 to receive a test signal TS from the memory 101. The delay for a signal transmitting from the ASIC 103 to the memory 101 is simulated, and the system can be adjusted according to the delay. A circuit of such would need an extra test port 105, an extra feedback port 107 and corresponding lines, i.e. with additional cost. Moreover, an extra step for simulating delay is also necessary, and the loading of the system thereby increases. By the way, a synchronization procedure would be required for the input data.

Therefore, a new invention is desired for solving the above-mentioned problems.

SUMMARY OF THE INVENTION

Therefore, one objective of the present invention is to provide a data reading circuit, which immediately adjusts the read data by a plurality of signals having specific relations for decreasing data reading error due to signal delay.

Another objective of the present invention is to provide a data reading circuit for a memory, which adjusts read data on time by utilizing the data reading clock signal for reading memory data and specific signals relative to the data reading clock signal, such that data reading error due to signal delay can be decreased.

One embodiment of the present invention discloses a data reading circuit, comprising: a first register, for receiving a first data signal and for sampling the first data signal according to the first edges of a first predetermined signal to generate a second data signal; a second register, coupled to the first register, for sampling the second data signal according to the second edges of a second predetermined signal to generate a third data signal; a first selector, coupled to the second register, for selecting one of the second and third data signals as a fourth data signal according to the phases of the first and second predetermined signals; a second selector, coupled to the first selector, for selecting one of the fourth and a fifth data signals as a sixth data signal according to an enable signal; and a third register, coupled to the second selector, for sampling the sixth data signal according to the first edges of the second predetermined signal to generate the fifth data signal.

If the data reading circuit is used for the memory, the second predetermined signal is a data reading clock signal for reading the data of the memory.

Another embodiment of the present invention discloses a data reading method, comprising: receiving a first data signal; sampling the first data signal according to the first edges of a first predetermined signal to generate a second data signal; sampling the second data signal according to the second edges of a second predetermined signal to generate a third data signal; determining if the phase error of the first predetermined signal and the second predetermined signal is larger than a predetermined value, if yes, selecting the second signal as the fourth data signal, if no, selecting the third signal as the fourth data signal; and utilizing the second predetermined signal to sample the fourth data signal for obtaining a correct data signal.

According to the above-mentioned circuit and method, the data read can be adjusted regardless of the frequency or delay of the data reading signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
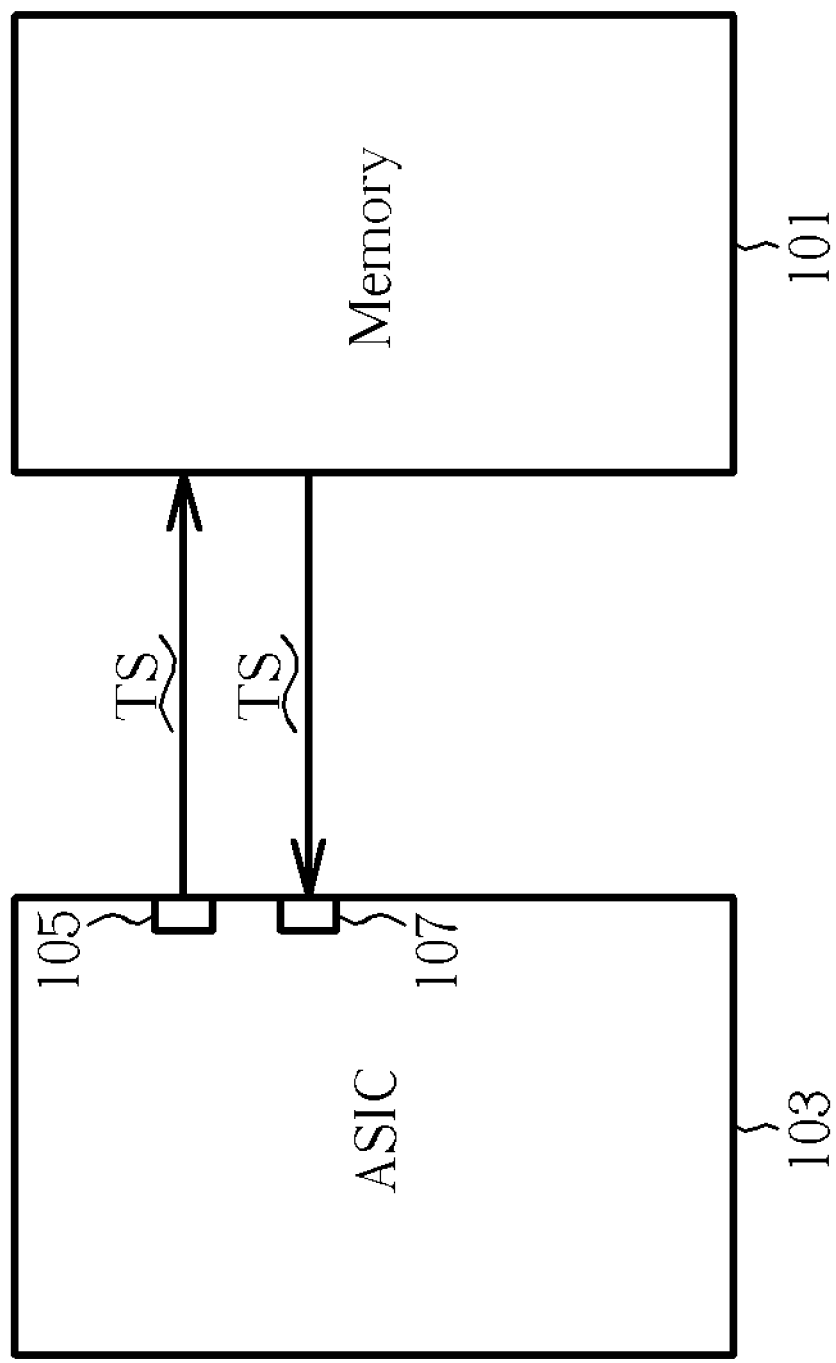
FIG. 1 illustrates a prior art data reading circuit.
Figure 2:
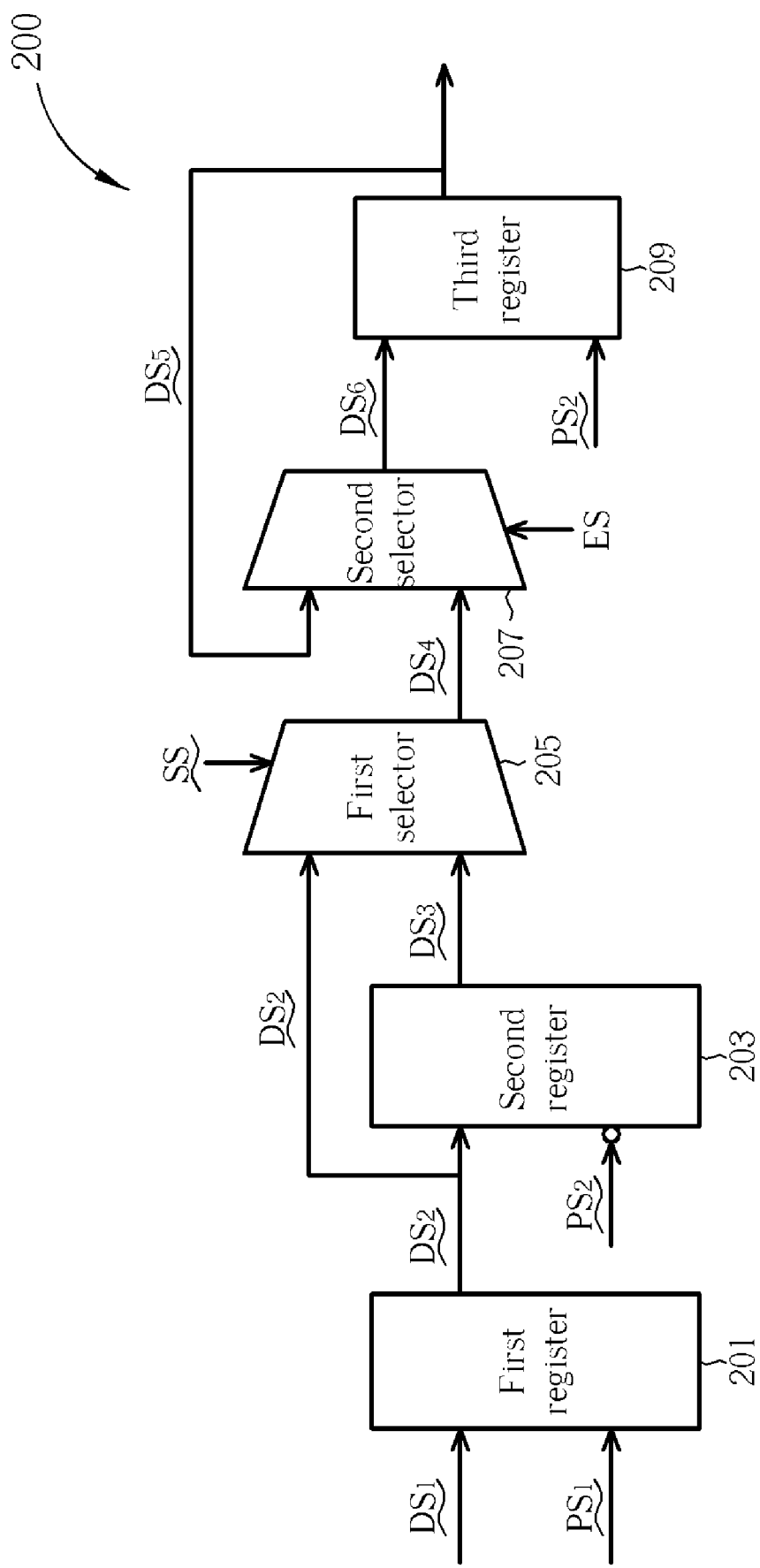
FIG. 2 illustrates the data reading circuit according to a preferred embodiment of the present invention.

FIG. 2 is a diagram of the data reading circuit 200 illustrated according to a preferred embodiment of the present invention. As shown in FIG. 2, the data reading circuit 200 includes a first register 201, a second register 203, a first selector 205, a second selector 207, and a third register 209. The first register 201 is used for receiving a first data signal $DS_1$ and for sampling the first data signal $DS_1$ according to the first edges of a first predetermined signal PS1 to generate a second data signal $DS_2$. The second register 203, which is coupled to the first register 201, is used for sampling the second data signal $DS_2$ according to the second edges of a second predetermined signal $PS_2$ to generate a third data signal $DS_3$. The first selector 205, which is coupled to the second register 203, is used for selecting the second data signal $DS_2$ or the third data signal $DS_3$ as a fourth data signal $DS_4$, which is in accordance with a selecting signal SS, wherein the selecting signal SS selects according to the phases of the first and second predetermined signals $PS_1$ and $PS_2$. The second selector 207, which is coupled to the first selector 205, is used for selecting either the fourth or a fifth data signal $DS_4$ and $DS_5$ respectively as a sixth data signal $DS_6$ according to an enable signal ES. The third register 209, which is coupled to the second selector 207, is used for sampling the sixth data signal $DS_6$ according to the first edges of the second predetermined signals $PS_2$ to generate the fifth data signal $DS_5$.

The data reading circuit 200 not only can be used for reading memory, but can also be used for reading other data. The second predetermined signal $PS_2$ can be a data reading clock signal for reading data in a memory. The data reading circuit 200 can be used for an ASIC. In this embodiment, the first edge of the first predetermined signal PS1 is a rising edge, and the first and second edges of the second predetermined signal PS2 are the rising edge and the falling edge respectively. The edges for sampling can be changed according to different requirements.

Figure 3:
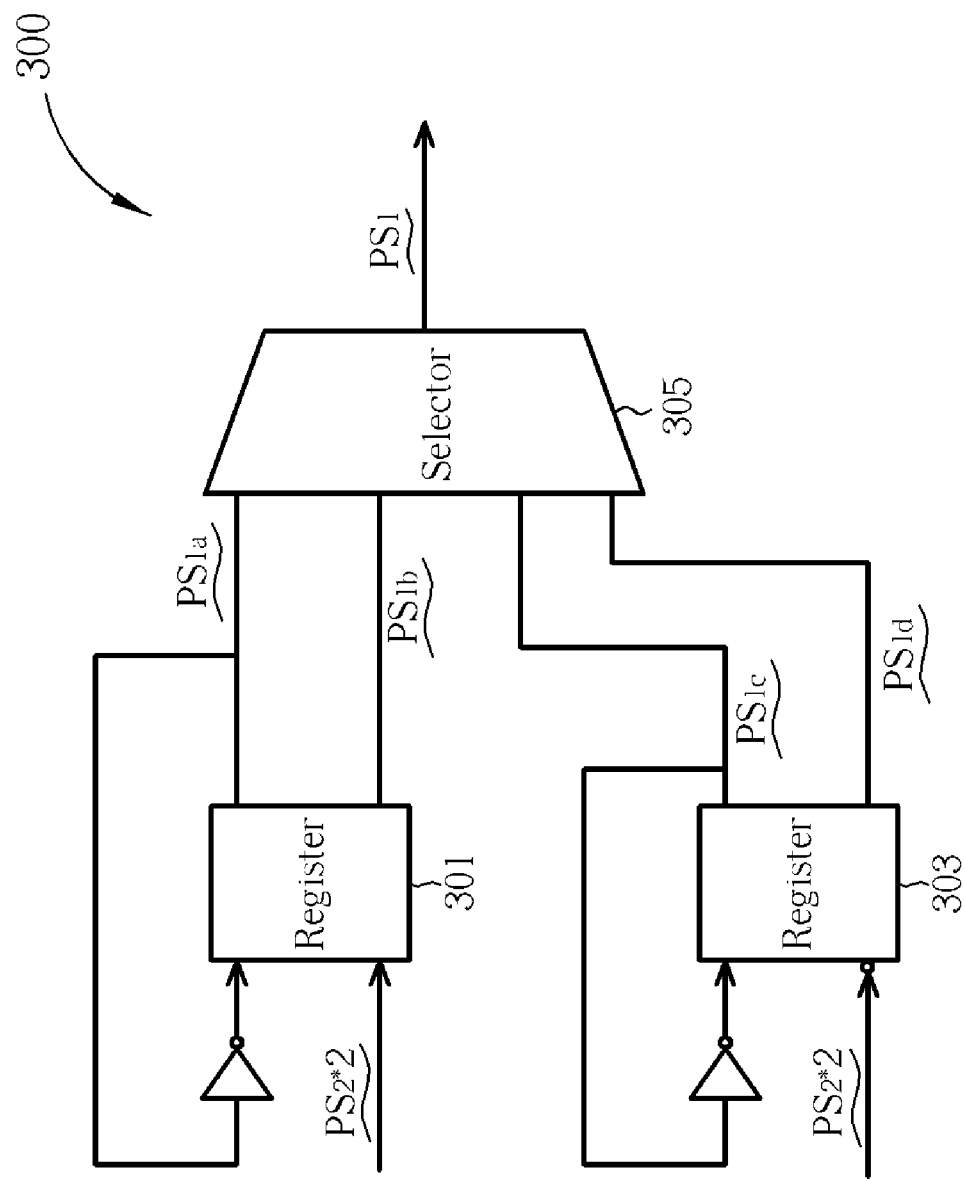
FIG. 3 illustrates the delay clock signal generating circuit of the data reading circuit shown in FIG. 2.

Furthermore, the delay clock signal generating circuit 300 shown in FIG. 3 can delay a two times frequency signal $PS_2 \times 2$ of the second predetermined signal $PS_2$ by a specific phase to generate the first predetermined signal $PS_1$. The two times frequency described here is only given as an example and is not meant to limit the scope of the present invention. Different multiples of the second predetermined signal $PS_2$ can be used for generating the first predetermined signal $PS_1$ by referring to the design requirements. As shown in FIG. 3, the delay clock signal generating circuit 300 includes a register 301, 303 and a selector 305. Delay clock signals $PS_{1a}$, $PS_{1b}$, $PS_{1c}$ and $PS_{1d}$ with different delay phases are generated according to the two times frequency signal $PS_2 \times 2$ of the second predetermined signal $PS_2$, and the selector 305 selects one of the delay clock signals $PS_{1a}$, $PS_{1b}$, $PS_{1c}$ and $PS_{1d}$ as the first predetermined signal $PS_1$. The second predetermined signal $PS_2$ is a data reading clock signal for reading data in a memory if the data reading circuit 200 is used for reading data in a memory, and the first predetermined signal PS1 is used for simulating the delayed data reading clock signal. Thus, one of the candidate delayed clock signals having the smallest difference with a real delay can be selected to perform subsequent processes by using other methods. Four phases are used in the above-mentioned embodiment, but the delay clock signal generating circuit 300 can generate other numbers of phases to meet design requirements. Additionally, the delay clock signal generating circuit can be implemented by an analog phase-locked circuit. No matter whether the delay clock signal generating circuit is an analog circuit or a digital circuit, details are omitted here for brevity.

Figure 4:
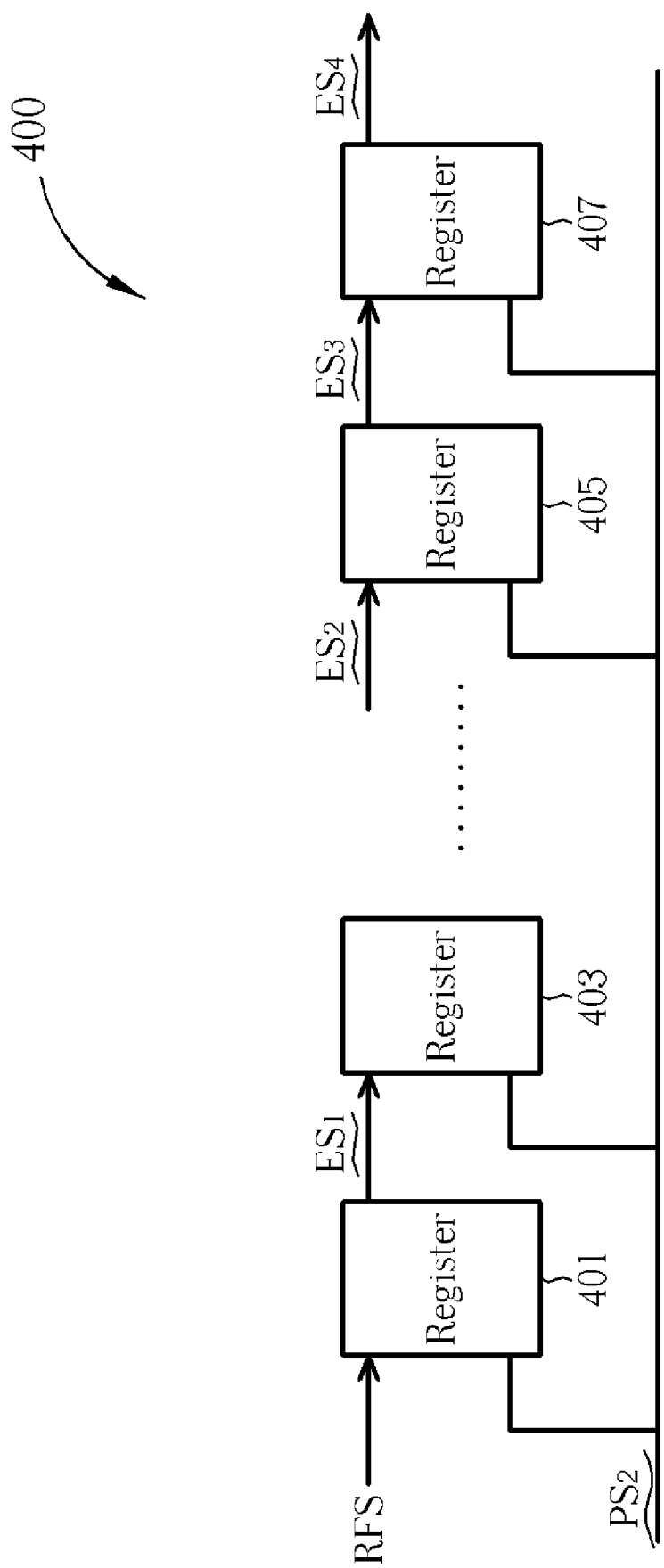
FIG. 4 illustrates the enable signal generator of the data reading circuit shown in FIG. 2.

The enable signal ES can be generated by using the enable signal generator 400 shown in FIG. 4. As shown in FIG. 4, the enable signal generator 400 includes registers 401, 403, 405 and 407, which sample according to the second predetermined signal PS2 and are used for delay stages. In other words, the enable signal generator 400 delays a reference selecting signal RFS to generate candidate enable signals $ES_1$, $ES_2$, $ES_3$ and $ES_4$, and outputs one of the candidate enable signals $ES_1$, $ES_2$, $ES_3$ and $ES_4$ as the enable signal ES. The second predetermined signal $PS_2$ can be a data reading clock signal for reading data in a memory if the data reading circuit 200 is used for reading data in a memory. The detailed structures and operation of the enable signal generator 400 are omitted here for brevity.

When the data signal enters the data reading circuit 200, the data reading circuit 200 uses the first predetermined signal $PS_1$ to determine which one of the data reading clock signal phases is used for reading data, and uses the enable signal ES to determine which clock of the first predetermined signal $PS_1$ is used for reading data. In other words, correct data reading timings can be obtained through this circuit, which also compensates the above-mentioned signal delay issue to obtain correct data. Furthermore, the falling edges of the second predetermined signal $PS_2$ can be used for sampling input data to increase accuracy of data corresponding to the relation between the data signal and the first predetermined signal $PS_1$, which is described as follows.

Figure 5:
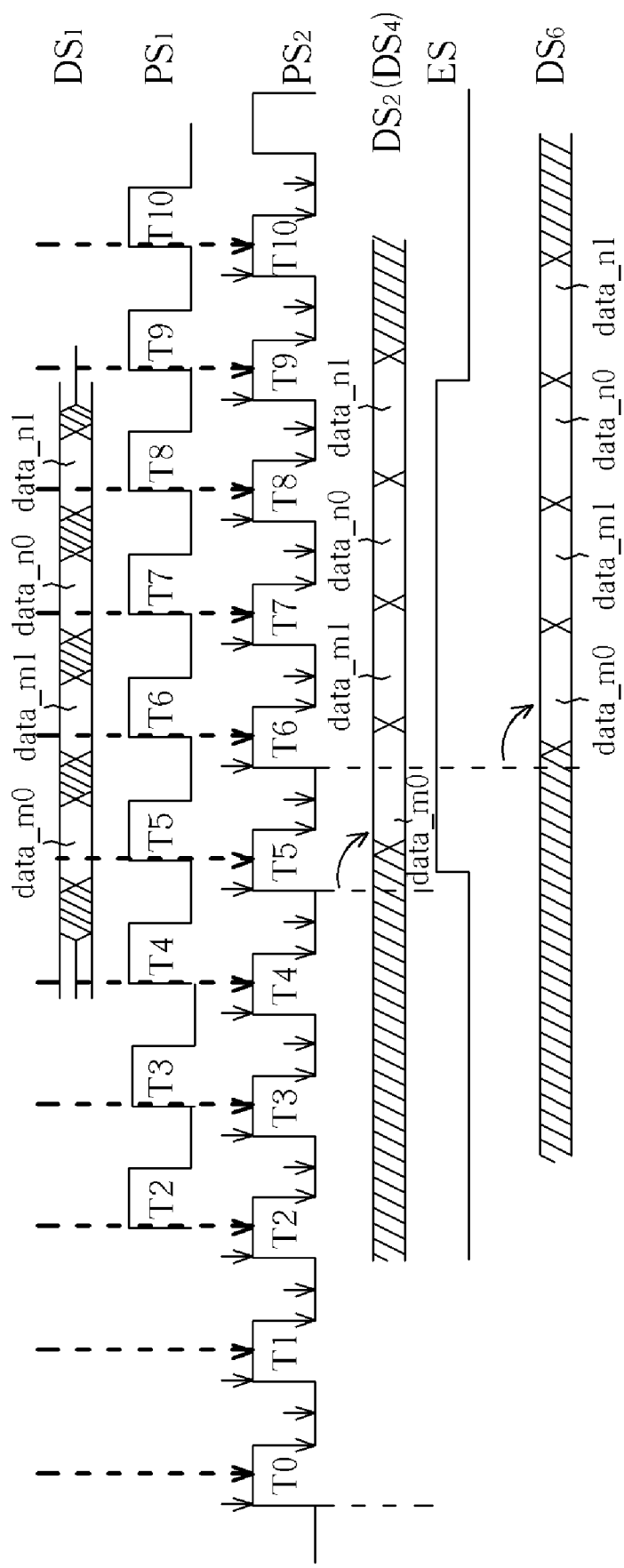
FIG. 5 illustrates the operation of the data reading circuit shown in FIG. 2.
Figure 6:
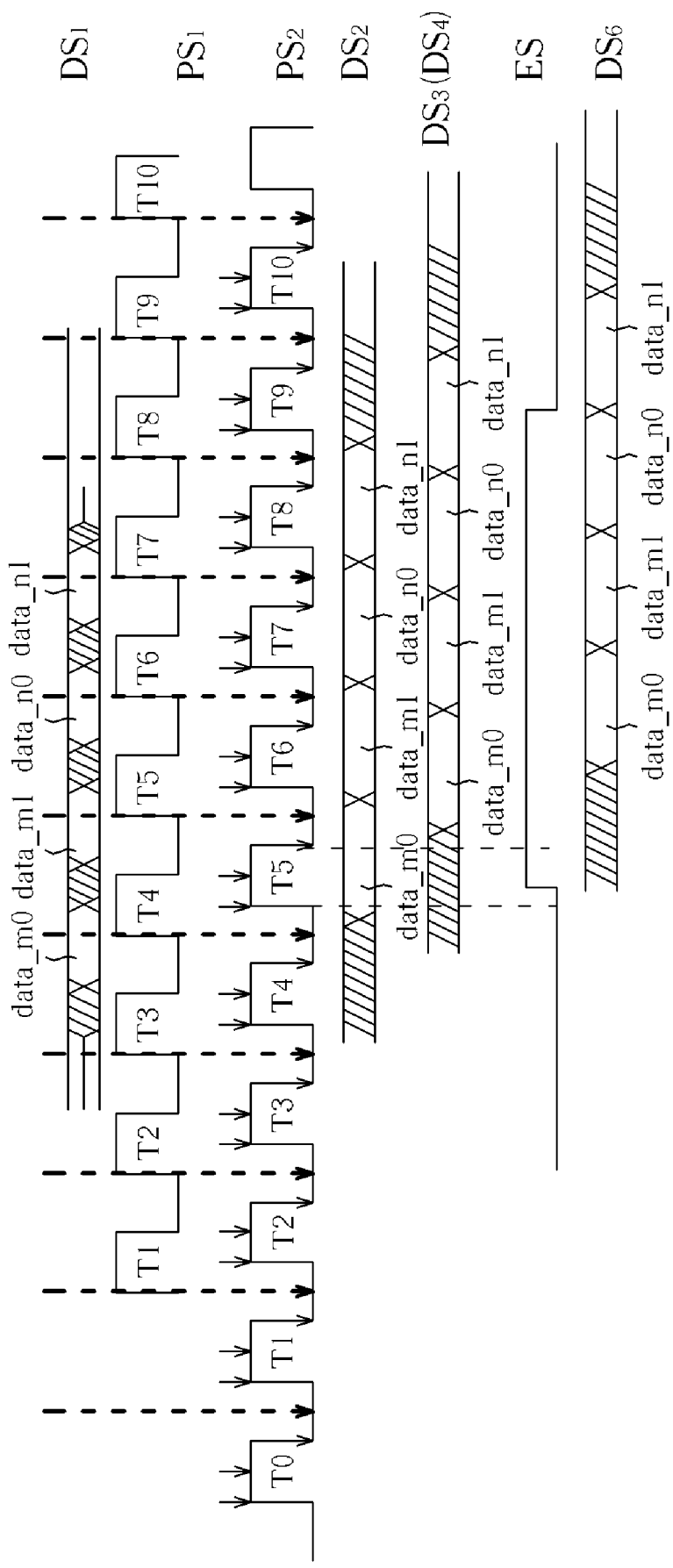
FIG. 6 illustrates the operation of the data reading circuit shown in FIG. 2.

FIG. 5 and FIG. 6 illustrate the operation of the data reading circuit 200 shown in FIG. 2. Please refer to FIG. 2, FIG. 5 and FIG. 6 to understand the present invention. FIG. 5 illustrates the operation of the data reading circuit 200 when the data signal $DS_1$ sampled by the second predetermined signal $PS_2$ is delayed by 90°. In this case, the first predetermined signal $PS_1$ falls behind the second predetermined signal $PS_2$ by 90°. As shown in FIG. 5, the data signal $DS_1$ is sampled by the rising edges of the first predetermined signal $PS_1$ to form a second data signal $DS_2$. As described above, the enable signal ES is used for determining which clock of the predetermined signal $PS_1$ will start to read data. In this case, the reading of data starts at the fifth clock. The sixth data signal $DS_6$ is sampled by the second predetermined signal PS2 to generate the fifth data signal $DS_5$, which is then outputted.

If the read data is correct and the timing for reading data does not need to be adjusted, the enable signal ES selects the fifth data signal $DS_5$ as the sixth data signal $DS_6$, such that the output circulates continuously. If the read data is incorrect and the timing for reading data needs to be adjusted, the enable signal ES selects the fourth data signal $DS_4$ as the sixth data signal $DS_6$. In general, such methods are used when the data signal $DS_1$ read by the second predetermined signal $PS_2$ is delayed by less than 180°. Although such methods can also be applied when the data signal $DS_1$ read by the second predetermined signal is delayed by a predetermined value, the suggestions provided above are not meant to limit the scope of the present invention.

FIG. 6 illustrates the operation of the data reading circuit 200 when the data signal $DS_1$ sampled by the second predetermined signal $PS_2$ is delayed by 270°. In this figure, the first predetermined $PS_1$ falls behind the second predetermined $PS_1$ by 270°. As shown in FIG. 6, the data signal $DS_1$ is sampled by the first predetermined signal $PS_1$ to form a data signal $DS_2$, and then the data signal $DS_1$ is sampled by the falling edges of the second predetermined signal $PS_2$ to form a third data signal $DS_3$. In this case, the selecting signal SS is used for selecting the third data signal $DS_3$ as the fourth data signal $DS_4$. The reason for sampling twice is that since the data signal is delayed by 270°, the delayed current data section will be too close to the next data section, incorrect data section may be obtained if the second data signal is directly used as the sampling object of the second predetermined signal $PS_2$ of the third data register 209. Therefore, the falling edges of the second predetermined signal $PS_2$ are used for sampling again to avoid such problems.

As described above, the enable signal ES is used for determining the clock of the second predetermined signal $PS_2$ which starts reading the data starts. In this case, the data starts to be read at the fifth clock T5. Next, the sixth data signal DS6 is sampled by the second predetermined signal $PS_2$ to generate the fifth data signal $DS_5$. If the read data is correct and the timing for reading data does not need to be adjusted, the enable signal ES selects the fifth data signal $DS_5$ as the sixth data signal $DS_6$, such that the output circulates continuously. If the read data is incorrect and the timing for reading data needs to be adjusted, the enable signal ES selects the fourth data signal $DS_4$ as the sixth data signal $DS_6$. Normally, such a method can be used if the data signal $DS_1$ read by the second predetermined signal $PS_2$ is delayed by more than 180°.

It should be noted that, although the data signal is sampled by the rising edges of the first predetermined signal $PS_1$ and is adjusted by the falling edges of the second predetermined signal $PS_2$, this embodiment is not meant to limit the scope of the present invention. For example, the data signal can be sampled by the falling edges of the first predetermined signal $PS_1$ and adjusted by the rising edges of the second predetermined signal $PS_2$, and this should also fall within the scope of the present invention.

Figure 7:
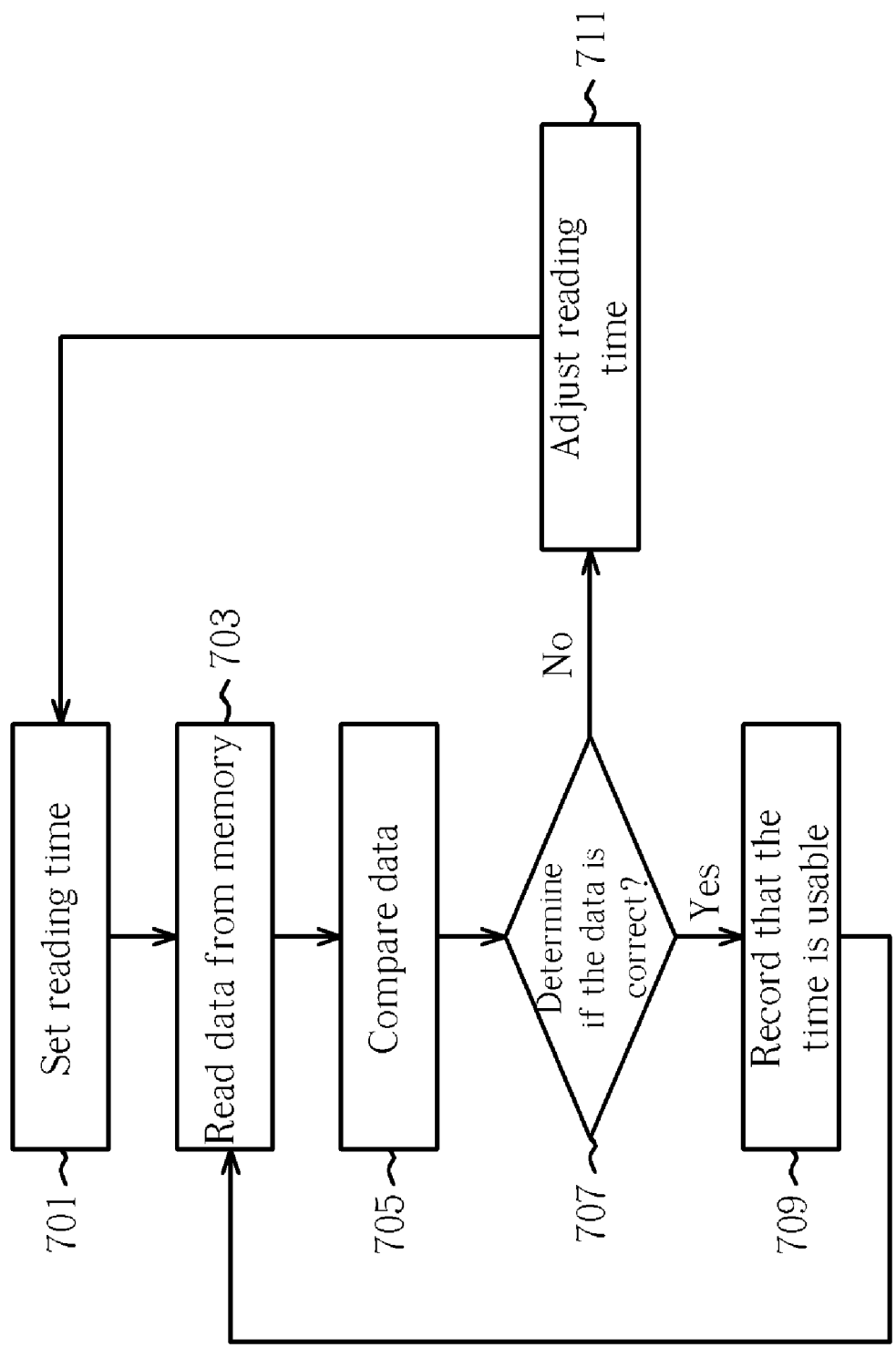
FIG. 7 illustrates the operation concept of the data reading circuit shown in FIG. 2.

FIG. 7 illustrates the operation concept of the data reading circuit shown in FIG. 2. As shown in FIG. 7, first, step 701 is entered to set reading time. In step 703, data is read from the memory. In step 705, data is compared. In step 707, it is determined if the data is correct, if yes, step 709 is entered to record that the time is usable, if no, step 711 is entered to adjust reading time.

Figure 8:
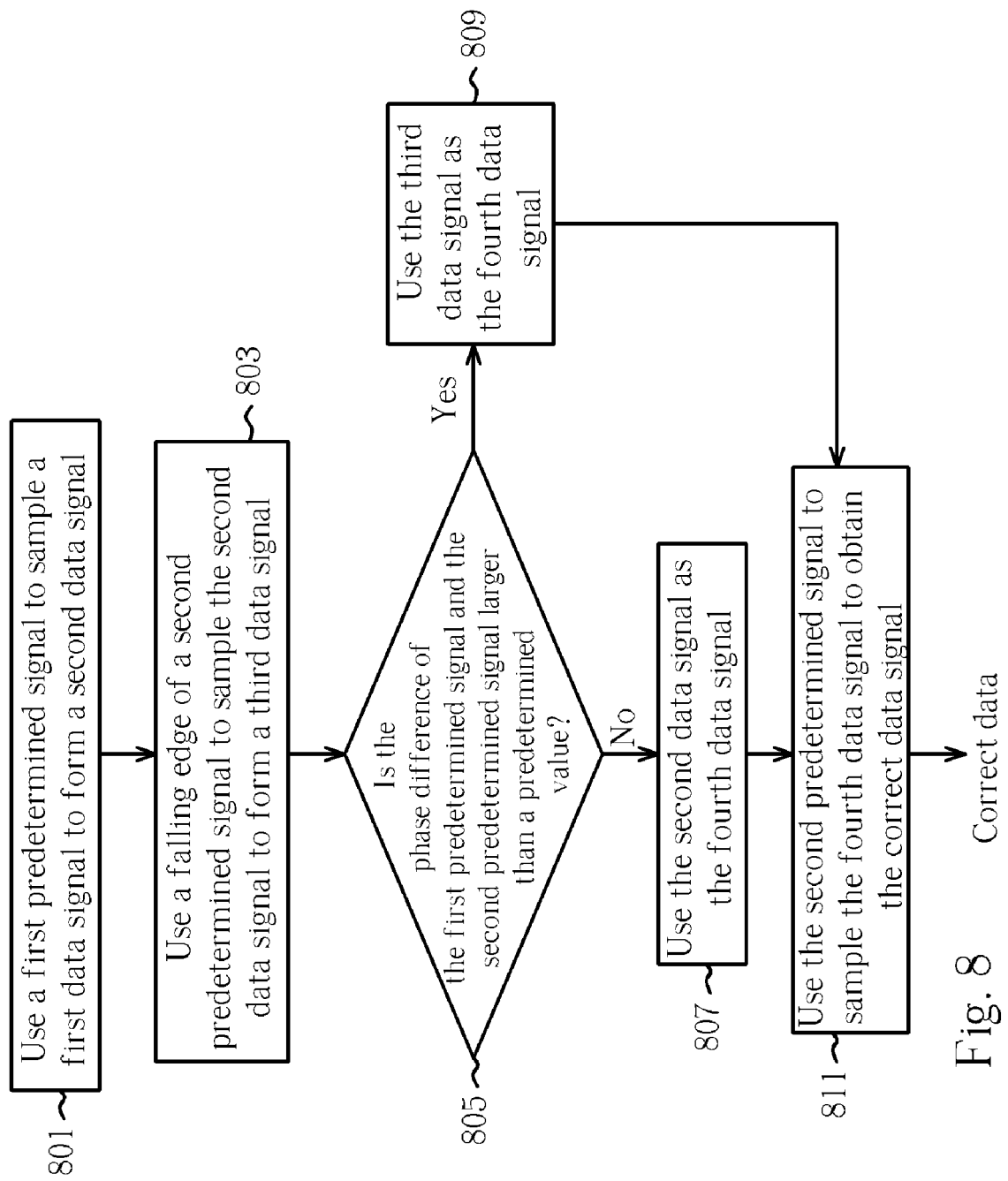
FIG. 8 is a flow chart illustrating a data reading method according to a preferred embodiment of the present invention.

FIG. 8 is a flow chart illustrating a data reading method exemplified according to a preferred embodiment of the present invention. As shown in FIG. 8, the method includes: step 801, to use a first predetermined signal to sample a first data signal to form a second data signal. Step 803, to use a falling edge of a second predetermined signal to sample the second data signal to form a third data signal. Step 805, to determine if the phase difference of the first predetermined signal and the second predetermined signal is larger than a predetermined value, if no, enter step 807 to use the second data signal as the fourth data signal, if yes, enter step 809 to use the third data signal as the fourth data signal. Step 811, to use the second predetermined signal to sample the fourth data signal to obtain the correct data signal.

Detailed characteristics of this method can be obtained according to the above-mentioned circuit.

By using the above-mentioned circuit, the synchronization circuit can be omitted and correct data can be obtained for any delay or operation frequency. If the circuit or method according to the present invention is used for FPGAs (Field-Programmable Gate Array) or ASICs, the same reading circuit used provides integrity of the whole circuit.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data reading circuit, comprising:
    a first register, for receiving a first data signal and for sampling the first data signal according to the first edges of a first predetermined signal to generate a second data signal;
    a second register, coupled to the first register, for sampling the second data signal according to the second edges of a second predetermined signal to generate a third data signal;
    a first selector, coupled to the second register, for selecting one of the second and third data signals as a fourth data signal according to the phases of the first and second predetermined signals;
    a second selector, coupled to the first selector, for selecting one of the fourth and a fifth data signals as a sixth data signal according to an enable signal; and
    a third register, coupled to the second selector, for sampling the sixth data signal according to the first edges of the second predetermined signal to generate the fifth data signal.

2. The data reading circuit of claim 1, further comprising:
    a delay clock signal generating circuit, for delaying an N times frequency signal of the second predetermined signal for a specific phase to generate the first predetermined signal, wherein N is larger than or equal to 2.

3. The data reading circuit of claim 2, being used for a memory, wherein the second predetermined signal is a data reading clock signal for reading data of the memory.

4. The data reading circuit of claim 1, further comprising:
    an enable signal generator, for delaying a reference selecting signal to generate a plurality of candidate enable signals, and outputting one of the candidate enable signals as the enable signal.

5. The data reading circuit of claim 4, being used for a memory, wherein the second predetermined signal is a data reading clock signal for reading data of the memory.

6. The data reading circuit of claim 1, being used for an ASIC.

7. The data reading circuit of claim 1, wherein the first edge is a rising edge and the second edge is a falling edge.

8. The data reading circuit of claim 7, wherein the phase of the first predetermined signal falls behind that of the second predetermined signal, where the selecting signal selects the second data signal as the fourth data signal if the phase difference of the first and second predetermined signals is smaller than a predetermined value, and the selecting signal selects the third data signal as the fourth data signal if the phase difference of the first and second predetermined signals is not smaller than a predetermined value.

9. The data reading circuit of claim 8, wherein the predetermined value is 180°.

10. A data reading method, comprising:
    receiving a first data signal
    sampling the first data signal according to the first edges of a first predetermined signal to generate a second data signal;
    sampling the second data signal according to the second edges of a second predetermined signal to generate a third data signal;
    determining if the phase error of the first predetermined signal and the second predetermined signal is larger than a predetermined value, if yes, selecting the second signal as the fourth data signal, if no, selecting the third signal as the fourth data signal; and
    sampling the fourth data signal with the second predetermined signal to obtain a correct data signal.

11. The data reading method of claim 10, further comprising:
    delaying an N times frequency signal of the second predetermined signal for a specific phase to generate the first predetermined signal, wherein N is larger or equal to 2.

12. The data reading method of claim 11, being used for a memory, wherein the second predetermined signal is a data reading clock signal for reading data of the memory.

13. The data reading method of claim 10, further comprising:
    delaying a reference selecting signal to generate a plurality of candidate enable signals, and outputting one of the candidate enable signals as the enable signal.

14. The data reading method of claim 13, being used for a memory, wherein the second predetermined signal is a data reading clock signal for reading data of the memory.

15. The data reading method of claim 10, being used for an ASIC.

16. The data reading method of claim 10, wherein the first edge is a rising edge and the second edge is a falling edge.

17. The data reading method of claim 16, wherein the phase of the first predetermined signal falls behind that of the second predetermined signal, where the selecting signal selects the second data signal as the fourth data signal if the phase difference of the first and second predetermined signals is smaller than a predetermined value, and the selecting signal selects the third data signal as the fourth data signal if the phase difference of the first and second predetermined signals is not smaller than a predetermined value.

18. The data reading method of claim 17, wherein the predetermined value is 180°.

* * * * *